May 2, 1950 J. L. JONKE 2,506,424
WORK HOLDING JIG FOR MULTIPLE SPINDLE MACHINES
Filed July 16, 1945 2 Sheets-Sheet 1
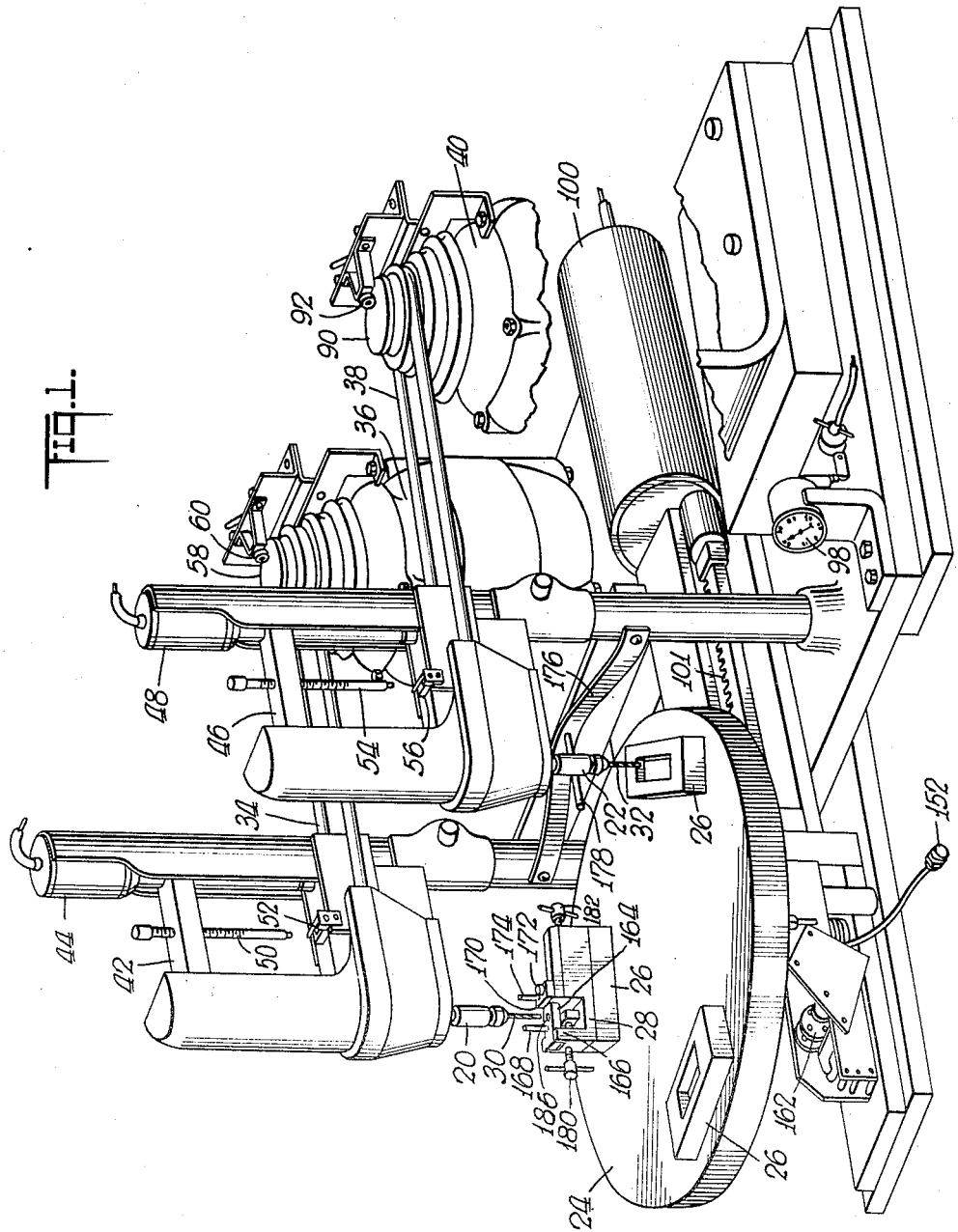
INVENTOR
Joseph L. Jonke
BY
Blair Curtis & Hayward
ATTORNEYS May 2, 1950            J. L. JONKE            2,506,424
WORK HOLDING JIG FOR MULTIPLE SPINDLE MACHINES
Filed July 16, 1945            2 Sheets-Sheet 2
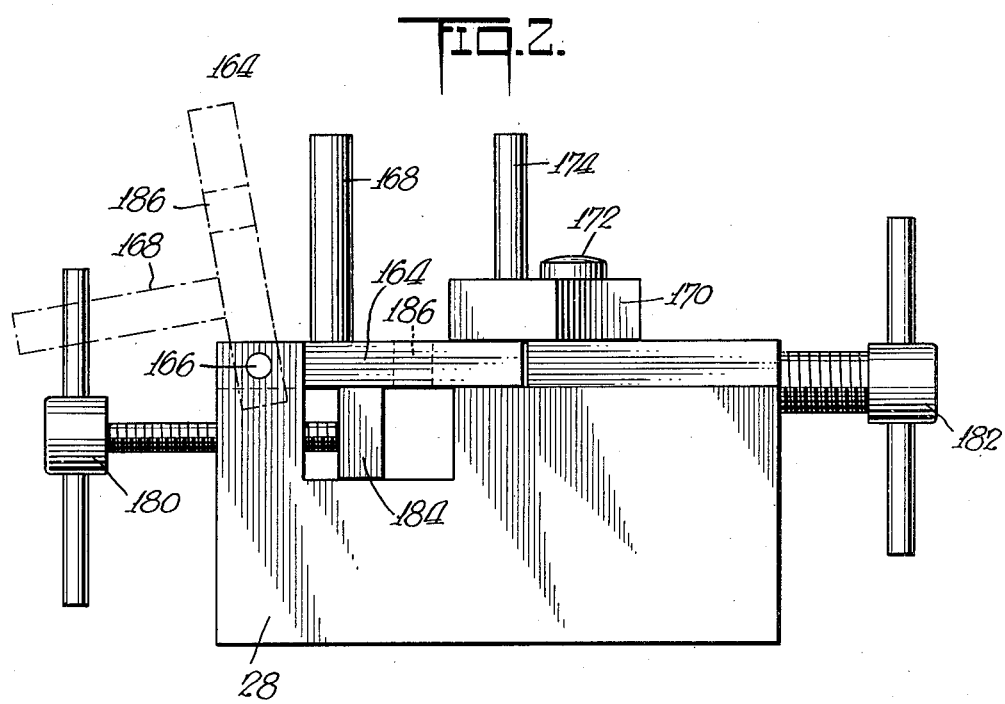
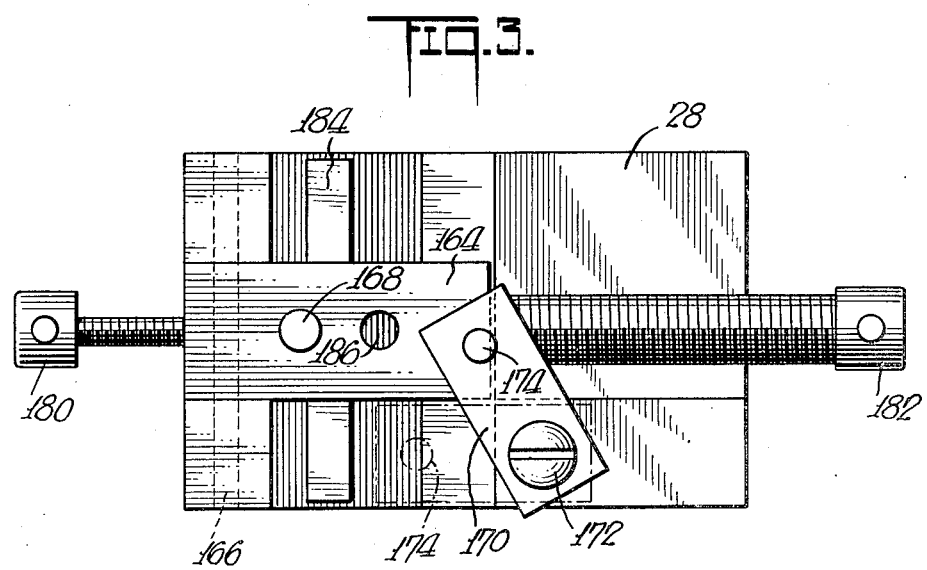
INVENTOR
Joseph L. Jonke
BY
Blair & Black
ATTORNEYS Patented May 2, 1950

2,506,424

UNITED STATES PATENT OFFICE 2,506,424

WORK HOLDING JIG FOR MULTIPLE SPINDLE MACHINES

Joseph L. Jonke, Queens Village, N. Y., assignor to Fairchild Camera and Instrument Corporation, Jamaica, N. Y., a corporation of Delaware Application July 16, 1945, Serial No. 605,283

3 Claims. (Cl. 77—64)

This invention relates to machine tools. More particularly it pertains to a type of production tool wherein operations are performed automatically with attendant advantages of higher output of product and longer life of tool cutting edges. By way of illustration the invention will be described as it is embodied in a multiple spindle drill press, where it has particular utility. Other applications of the invention will immediately be apparent to those skilled in the art.

In a conventional multiple spindle drill press a series of vertically arranged spindles are positioned over a horizontal work table. The various spindles are provided with chucks for receiving different sizes and types of drills, reamers, etc. In operating such a machine the operator first locks the work piece in a drill jig and then pushes the drill jig about on the surfaces of the horizontal table beneath the overlying tools. He positions the drill jig beneath the respective tools one at a time, in a predetermined sequence such as for drilling, boring and reaming, and lowers each tool in turn by means of a handle to perform the specified operations on the piece of work in the drill jig. The result is that in addition to the time consumed in placing the work piece in the drill jig (during which period the various tools of the drill press are idle) the time of the operator is consumed in locating the drill jig successively beneath the desired spindles, one at a time, and in lowering each tool manually to perform the intended operations.

Heretofore it was believed that there was advantage in having tools such as drills and reamers fed by hand for the reason that these tools are relatively fragile and are easily broken. A skillful operator feeding the tool into the work was able to feel, after he had had sufficient practice, the hard spots in the work piece. Accordingly he could proportion the force applied to the tool as dictated by his experience. A good operator thus could get considerably more life from a drill, for example, than could an inexperienced operator because of the manner in which the skilled operator could feel his way along as the tool progressed into the work piece.

I have discovered a combination of a movable work table with a series of overlying, vertical spindles whereby the machine operator need only position the work piece in a jig attached to the work table and then later remove the work piece from the jig after it has been machined. With my arrangement the spindles perform their machining operations while the machine operator is loading and unloading work pieces into and out of a free work holder in front of him. And I have provided a pneumatically operated tool feeding device whereby controlled air pressures are supplied such that the drills, reamers, etc., are properly fed and cannot readily be broken. By supplying optimum air pressures to the respective tool feeding devices I have found that the lives of the tools may be increased to the maximum.

It is an object of my invention to provide a production machine of the character described having to a notable extent the characteristics and advantages hereinbefore set forth. A further object is the provision of a multiple spindle machine tool, which may be inexpensively manufactured, and which is simple in operation and requires little maintenance. Other objects will be in part pointed out as the description proceeds and will in part become apparent therefrom.

The invention accordingly consists in the features of construction, combinations of elements, methods of operation, and arrangements of parts as will be exemplified in the structure to be hereinafter described and the scope of the application of which will be set forth in the accompanying claims.

In the drawings:

Figure 1 is a perspective view showing a multiple spindle drill press embodying the invention;

Figure 2 is an enlarged side elevation of one of the work-piece holding jigs showing in phantom view the guide leaf in open position; and Figure 3 is a plan view of the jig in Figure 2 showing in phantom view the leaf lock in open position.

In Figure 1 a pair of spindles are indicated by 20 and 22 vertically arranged over a work table 24. Table 24 is mounted for clockwise rotation (as viewed from above) about its center point, as will be described more fully hereinafter, and it is equipped with fixtures 26 whereby work piece holding jigs may be affixed to the work table. One work piece holding jig 28 is indicated beneath spindle 20. In the embodiment illustrated spindle 20 carries a drill 30 and spindle 22 carries a reamer 32. A work piece is loaded into a jig at the free position or loading station and thereafter the table rotates through one third of a revolution to position the work piece beneath spindle 20. A drilling operation is performed upon the work piece during which time another work piece is inserted into the following jig. Thereafter the table again rotates clockwise through one third of a revolution positioning the first work piece beneath the reamer and the second work piece beneath the drill. A reaming operation is performed simultaneously with the drilling operation and meanwhile a third work piece is positioned in the free work piece holder. The work table rotates clockwise again through one third of a revolution and the second work piece goes to the reaming position and the third work piece goes to the drilling position. The first work piece is back at the loading station and it is removed from the work piece holder and a new work piece is inserted. The various controls whereby these operations are performed will be described hereinafter.

Spindle 20 is driven in a more or less conventional fashion through a belt 34 by means of a motor 36. Reamer 30 correspondingly is driven through a belt 38 by means of a motor 40. Spindles 20 and 22 are held in their raised positions by the pressure of return springs (not shown). Spindle 20 is lowered, when a drilling operation is to be performed, by an arm 42 against the pressure of its return spring by means of a pneumatic cylinder and piston assembly 44. Likewise spindle 22 is fed downwardly by means of an arm 46 operated by a pneumatic cylinder and piston assembly 48. Arm 42 is provided with an adjustable finger 50 which may be raised or lowered in arm 42 by means of a central threaded portion. A sensitive, low travel limit switch 52 is located in the path of movement of finger 50 so that when arm 42 has moved spindle 20 downwardly a sufficient distance the end of finger 50 comes into operating contact with switch 52 to interrupt the drilling operation. Likewise arm 46 is provided with an adjustment-threaded finger 54 for operating a second sensitive, low travel limit switch 56 positioned therebelow to interrupt the reaming operation when the reamer has been advanced sufficiently far downwardly into the work piece.

The upper end of the motor shaft of motor 36 carries a horizontally positioned plate 58. This plate rotates constantly with the operation of motor 36. A running wheel 60 is fixedly held against the surface of the rotating plate 58 and the velocity with which wheel 60 turns may be controlled by adjusting its radial position upon plate 58. The greater the distance of wheel 60 from the center of rotation of plate 58 the greater the number of revolutions per minute turned by wheel 60. Motor 40 which operates the reamer is equipped with identical parts which perform the same functions: It has a positioned plate 90 on which wheel 92 runs. To wheels 60 and 92 are attached suitably controlled mechanisms (not shown) so that by adjusting the position of the wheels on their respective plates the frequency with which arms 42 and 46 are permitted to return upwardly to clear the chips may be regulated.

Regulator 98 is provided to adjust the proper air pressure in cylinder 48. Cylinder 44 is provided with a similar regulator. Thus by proper adjustment automatic control can be had of the entire drilling and reaming operations. Such automatic control is derived from the cooperative functioning of switches 52 and 56 of the timing mechanisms attached to wheels 60 and 92, and of the pressure regulators for cylinders 44 and 48. The detailed construction of these parts need not be described for purposes of this invention.

In order to rotate table 24 between machining operations I have provided a pneumatically operated indexing construction including a cylinder 100 of the double acting type, whereby the piston is positively driven first in one direction and then in the other. Table 24 is rotated one third of a revolution with each cycle of the piston. The specific mechanisms by which this is accomplished will not be described as it is to be understood that any suitable means for so accomplishing the result will suffice for the purposes of my invention. Nevertheless, in the embodiment of my machine tool shown in Figure 1, a timing mechanism 162 is provided which is preferably of the type shown in the accompanying application of Leonard W. Gacki, Serial No. 520,575, filed January 31, 1944.

At a position below table 24 is shown a push button 152 which causes operation of a complete cycle of the machine tool; the various circuits and mechanisms by which this is accomplished are not described in detail.

In the illustrated machine I have used a work piece holding jig 28 having a leaf 164 for guiding the drill into the work piece. Leaf 164 is hinged at 166 to the jig and carries an upwardly projecting stud 168. Leaf 164 is maintained in position by a lock 170 pivotable about the vertical axis of pin 172 upon jig 28. As shown in Figure 1, leaf 164 cannot swing upwardly about hinge 166 because its free end is covered by lock 170. Lock 170 also has an upwardly projecting stud indicated at 174. Between the upright standards of the spindles is a fixed yoke 176 carrying a trip pin 178. Pin 178 lies in the normal path of movement of studs 174 and 168 in passing from the drilling position to the reaming position. As stud 174 engages pin 178, lock 170 is swung about the axis of pin 172 to uncover the end of leaf 164. So, when stud 168 engages pin 178, the leaf is free to swing upwardly and backwardly and thus the leaf is removed from the guiding position it occupied during drilling. In this fashion I relieve the machine operator of an operational detail which otherwise he would be required to perform.

Figures 2 and 3 are enlarged views of work piece holding jig 28 showing more clearly in detail the interlocking relationship of the leaves. The jig is provided with clamps 180 and 182 for holding the work piece (not shown) securely in place. Clamp 180 is designed with vice jaw 184 for this purpose and clamp 182 may be similarly constructed if desirable.

Figure 2 shows by broken lines the position of guide leaf 164 when it is open for the reaming operation. By solid lines the guide leaf is shown locked under the influence of lock 170. In the drilling operation the bit is guided into the work piece through opening 186.

Figure 3 illustrates the locked and unlocked positions of leaf lock 170—the former being shown by solid lines and the latter by broken lines.

To use the equipment thus described, the machinist places a part to be machined in the jig which is positioned in front of him on table 24. He then presses button 15 in order to initiate a complete cycle of operation. Through the various electrical and pneumatic circuits, table 24 is rotated clockwise one-third of a revolution, at which point the jig just loaded is positioned beneath spindle 20. The timing system then allows air to be admitted to cylinder 44 so that spindle 20 is brought down to machine the work piece. During this time the operator is loading a second work piece into another jig mounted on the fixture before him. When the drilling operation is completed, the end of finger 50 actuates switch 52 to interrupt the drilling operation and to return the drill to its upward position. Now when the operator presses button 152 to initiate a second cycle of operation, the work piece which was just drilled will be exposed to reamer 32 as the jig on which it is mounted is carried clockwise by another one-third revolution of the table. This is accomplished by the action of trip pin 178 against studs 174 and 168 as hereinbefore described. As the cycle continues and as the operator loads the third work piece onto the final fixture which is before him, air which is admitted into cylinder 48 causes spindle 22 to be depressed so as to ream out the hole that was drilled in the first work piece. The reaming operation is arrested by the end of finger 54 which trips switch 56. Simultaneously with this reaming operation the second work piece is being drilled in the fashion just described. Now when button 152 is pressed to start another cycle of operation the first work piece which was introduced is rotated to a position in front of the operator. It is finally drilled and reamed and is freely open for removal from the clamps of the jig in which it is mounted. The fourth piece to be machined may then be clamped into this jig and positioned under the locked guide by the time the previous cycle of operation is completed. Thus I have provided a sturdy and economical arrangement for performing dual operations with a minimum amount of lost motion on the part of the operator.

From the foregoing it will be seen that a production machine made in accordance with the present invention is well adapted to attain the ends and objects hereinbefore set forth and to be economically manufactured, since the whole combination is suited to common engineering methods and is susceptible to a wide latitude of variations as may be desirable in adapting the invention to different applications.

As many possible embodiments may be made of the above invention without departing from the scope thereof and as changes may be made in the embodiment set forth, it is to be understood that all matter herein set forth or shown in the accompanying drawings is to be interpreted as illustrative and not in a limiting sense.

I claim:

1. In a machine tool of the type wherein a work-supporting table moves through an endless path with respect to a machining assembly comprising a tool and a tripping mechanism, the combination with such tool of a work piece holding device fixed to the table and adapted to receive and hold a work piece during machining; said device including: a work piece clamp, a stud projecting from said clamp, a clamp lock, and a stud projecting from said lock; said clamp and said lock being relatively movable with respect to each other through intersecting paths, and said studs moving with the movement of the table through its endless path in tripping relationship past the tripping mechanism; said lock stud being disposed in advance of said clamp stud.

2. In a multiple spindle machine tool of the type which includes a movable table upon which work pieces are fed to a machining assembly comprising a tool and a tripping mechanism, the combination with such tool of a plurality of workpiece holding jigs fixed to said table for receiving and holding work pieces during operation, each jig having a guide leaf hinged thereupon and a leaf lock for holding the guide leaf in a fixed position during a machining operation, said guide leaf and said leaf lock each having a stud projecting therefrom, said leaf lock stud being positioned in advance of said guide leaf stud, whereby during a table movement said leaf lock stud comes into engagement with said tripping means to move said leaf lock to one side and thereafter said guide leaf stud comes into engagement with said tripping means to swing back said guide leaf and uncover the work piece.

3. In a multiple spindle machine tool of the type which includes a movable table upon which work pieces are fed to a machining assembly comprising a tool and a tripping mechanism, the combination with such tool of a plurality of workpiece holding jigs fixed to said table for receiving and holding work pieces during operation, each jig having a guide leaf hinged thereupon and a leaf lock swingable about a pivot point for covering a portion of the guide leaf and for holding the guide leaf in a fixed position during a machine operation, said guide leaf and said leaf lock each having a stud projecting therefrom, said leaf lock stud being positioned in advance of said guide leaf stud, whereby during a table movement said leaf lock stud comes into engagement with said tripping means to move said leaf lock to one side and thereafter said guide leaf stud comes into engagement with said tripping means to swing back said guide leaf and uncover the work piece.

JOSEPH L. JONKE.

REFERENCES CITED

The following references are of record in the file of this patent:

UNITED STATES PATENTS

| Number | Name | Date |
|---|---|---|
| 320,536 | Bryant | June 23, 1885 |
| 1,583,946 | Walters | May 11, 1926 |
| 1,723,249 | Noble | Aug. 6, 1929 |
| 1,911,138 | Clute et al. | May 23, 1933 |
| 2,389,744 | Robbins | Nov. 27, 1945 |
| 2,394,769 | Heckethorn | Feb. 12, 1946 |
| 2,414,347 | Woerner | Jan. 14, 1947 |
| 2,422,114 | Matter | June 10, 1947 |